United States Patent

Yazawa et al.

[11] 3,904,334
[45] Sept. 9, 1975

[54] APPARATUS FOR SHAPING TUBULAR FILM

[75] Inventors: Masahide Yazawa; Tokio Okada, both of Tokyo, Japan

[73] Assignee: Polymer Processing Research Institute Ltd., Tokyo, Japan

[22] Filed: Dec. 3, 1973

[21] Appl. No.: 420,996

Related U.S. Application Data

[63] Continuation of Ser. No. 143,312, May 14, 1971, abandoned.

[30] Foreign Application Priority Data

June 8, 1970 Japan.......................... 45-49310

[52] U.S. Cl. .................... 425/71; 264/95; 425/72; 425/326 R; 425/387 R; 425/388; 425/445
[51] Int. Cl............................................. B29d 7/20
[58] Field of Search ......... 264/89, 90, 95, 209, 237, 264/348; 425/71, 72, 326 R, 387 R, 325 R, 404, 445, 446, 388; 277/134

[56] References Cited
UNITED STATES PATENTS

| | | | |
|---|---|---|---|
| 2,955,321 | 10/1960 | Fortner et al. | 264/95 X |
| 3,377,413 | 4/1968 | Jansson et al. | 264/95 |
| 3,532,780 | 10/1970 | Kakutani et al. | 264/95 |
| 3,600,488 | 8/1971 | Yazawa | 425/71 X |
| 3,663,134 | 5/1972 | Coquelin | 425/72 |

FOREIGN PATENTS OR APPLICATIONS

330,977 1972 U.S.S.R. .................... 425/72

*Primary Examiner*—R. Spencer Annear
*Assistant Examiner*—Mark Rosenbaum
*Attorney, Agent, or Firm*—Fred Philpitt

[57] ABSTRACT

An apparatus for shaping tubular films by wet process from a polymer liquid by passing a tubular film in a coagulating step through and in contact with a cylindrical opening or hole having concave grooves on its inside surface, successively a cylindrical net surrounded with a reduced pressure chamber providing a vacuum sealing means, a flattening means and pinch rollers, while inflating the tubular film and allowing a coagulant to come in contact with the tubular film. At least one stage of weirs is provided around the cylindrical net below the cylindrical hole to hold the descending coagulant. The coagulant is also supplied within the tubular film and retained above the pinch roller to a desired depth. The tubular film can be obtained steadily without any formation of wrinkles thereby.

2 Claims, 6 Drawing Figures

PATENTED SEP 9 1975 3,904,334
SHEET 2 OF 2
FIG. 2
FIG. 3a
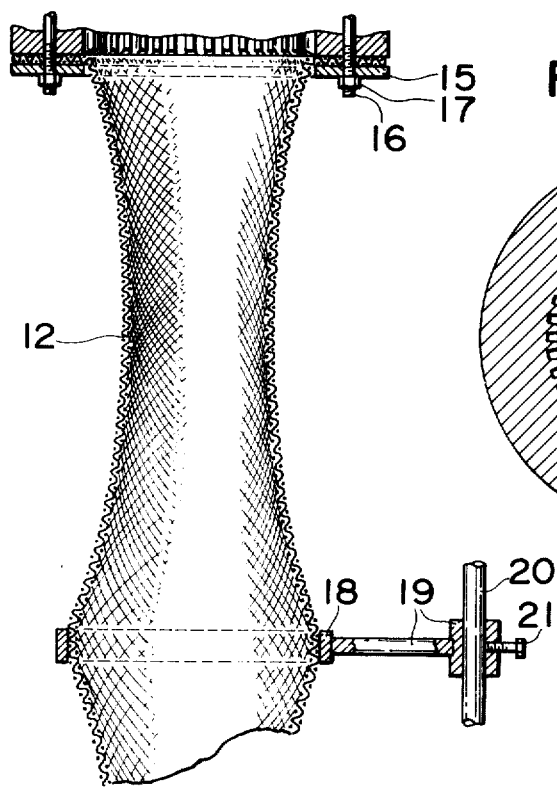
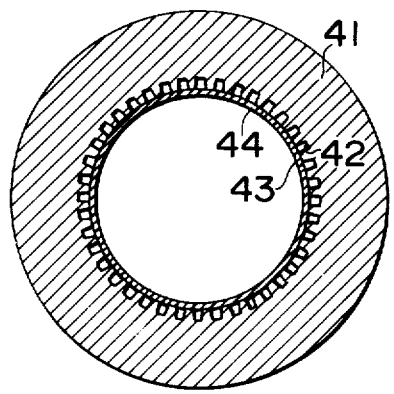
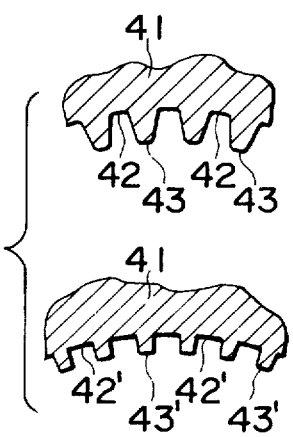
FIG. 3b
FIG. 3c
FIG. 3d
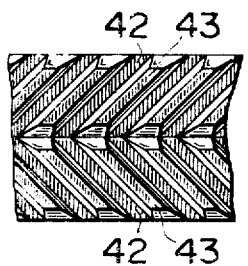
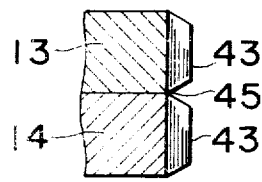
INVENTOR.
BY

APPARATUS FOR SHAPING TUBULAR FILM

RELATED APPLICATION

This application is a continuation of application Ser. No. 143,312 filed on May 14, 1971 (now abandoned) and since the present application is being filed during the pendency of Ser. No. 143,312 the benefits afforded by 35 USC 120 are claimed with respect to it.

This invention relates to an apparatus for shaping a tubular film by wet process and more particularly to an improved apparatus for shaping a tubular film by wet process where a coagulant is allowed to come in contact with the outer periphery of a tubular polymer liquid extruded downwards from an annular die.

In this specification, a molten polymer and a dope, that is, a polymer dissolved in a solvent are collectively denoted as "polymer liquid" and solidification effected by a coolant in case of a molten polymer and coagulation effected by a coagulant are collectively denoted as "coagulation" and a coolant and a coagulant are collectively denoted as "coagulant," in order to simplify these descriptions.

The present inventors propose an apparatus for shaping a tubular film by wet process, wherein the tubular film is shaped by wet process by allowing a coagulant to come in contact with the outer periphery of a tubular polymer liquid extruded downwards from an annular die, characterized by passing a tubular film in a coagulating step vertically through a reduced pressure chamber, providing a reduced pressure sealing means at the outer periphery of the tubular film in the respective opening or holes for passing the tubular film at the top and bottom walls of the reduced pressure chamber with a retained liquid of the descending coagulant, suspending a flexible cylindrical net under a controlled downward tension to penetrate the passage hole of the reduced pressure chamber, allowing the tubular film in the coagulating step to move downwards while lightly contacting with the inside surface of the cylindrical net and at the same time allowing the coagulant retained at the upper side of the upper wall to readily descend while allowing the coagulant to be sucked downward into the reduced pressure chamber along the surface of the tubular film. When the length of the top wall hole (thickness of hole plate) of the reduced pressure chamber is shorter than the opening mesh size of the cylindrical net, the coagulant passes through a gap (which corresponds to a concave groove of the present invention which will be explained later) between the net yarns and the wall and flows down into the reduced pressure chamber. In many cases, the depth of the retained liquid of the coagulant at the upper side of the top wall of the reduced pressure chamber is as small as about 5 – 10 mm. When the coagulation takes place slowly, the outer peripheral skin portion of the tubular polymer liquid is often transferred into the reduced pressure chamber as it is in an insufficient coagulation state, and the tubular film is liable to be pressed to the cylindrical net by a pressure effect based on a sum of the internal inflation pressure and the reduced pressure in the reduced pressure chamber. Therefore, the uncoagulated tubular film is projected out of the net openings outwards and occasionally caught by the net openings. That is, the film surface is often damaged thereby. Thus a smooth operation cannot be often assured on account of these disadvantages in the abovementioned case.

When the coagulation can be almost completed at an immersion depth (contact length) of cooling water, or coagulant, of about 5 – 7 mm, as in the case of low speed shaping of a thin film of molten polymer, said method can be carried out without any trouble. However, in the case of a thick film, or high speed shaping of a thin film or particularly in the case of a polymer dope dissolved in a solvent, an immersion depth of a coagulant of about 20 – 50 mm or more is required to effect a coagulation to such a degree that the outer peripheral skin portion of the tubular film in the coagulating step can come in contact with and slide over solid walls consisting of yarns of the net, etc. without any trouble. Particularly, when the hole for passing the tubular film, of the cylindrical hole of the top wall of the reduced pressure chamber has a length of 20 – 30 mm, a large number of serial rows of concave grooves are provided at the inside wall surface of the cylindrical hole to prevent a unbalanced partial flow. Even if the tubular film moves downwards almost in contact with the projected parts of the inside wall surface, the necessary and sufficient amount of the coagulant flows down in contact with the film through the serial rows of concave grooves while allowing the coagulant to be sucked into the reduced pressure chamber. That is to say, it is necessary to provide a sufficient immersion depth of only a coagulant so as to effect the coagulation to such an extent that the outer peripheral skin portion of the tubular film in the coagulating step can withstand a frictional sliding against a solid wall consisting of yarns of a net, etc. Then, the tubular film is allowed to come in contact with the cylindrical net suspended at the lower end of the cylindrical hole having an open end in the reduced pressure chamber. Otherwise, smooth shaping operation cannot be assured and products free of the surface damages are hard to obtain. These have been confirmed by the test results.

However, when an amount of a coagulant descending along the cylindrical net below the cylindrical hole is 10 – 20 times the amount of the extruded polymer liquid, as will be mentioned later, even in case where the length of the cylindrical hole at the top wall is short or in the case where the cylindrical hole is lengthened and a large number of concave grooves are provided, as mentioned above, the coagulant often flows down mainly along the outside of the cylindrical net and is liable to gather into several thick streams, that is, channelling.

To prevent such a channelling substantially, at least one weir for gathering the liquid for a while in a ring shaped pool formed thereby is provided in contact with the outside surface of the cylindrical net in the reduced pressure chamber, as will be mentioned in detail later. It has been confirmed by an experimental result that such a means is effective for preventing the channelling of the coagulant flowing down along the cylindrical net, stirring the coagulant well in the pool and making the coagulant flow down along the cylindrical net successively while making the temperature or concentration of the coagulant uniform. It is the first feature of the present invention to provide the horizontal weir for holding the liquid together with provision of a reduced pressure chamber.

In the present invention, it is not always the necessary condition to fix the upper end of the cylindrical net to the lower end of the cylindrical hole at the upper wall in the reduced pressure chamber to suspend it. Even if the cylindrical net is fixed to the upper side or a position beyond the upper side of the cylindrical hole to suspend it through the cylindrical hole, or even if the serial rows of concave grooves are provided at the inside wall of the cylindrical hole and the cylindrical net is suspended in contact with the inside projected wall of the cylindrical hole, the cylindrical hole is open to the reduced pressure chamber at its lower end, and therefore the coagulant which descends by suction can flow down together with the descending tubular film in sufficient contact with the tubular film and consequently the tubular film, descending in contact with the cylindrical hole is less liable to project itself through the net openings outwards in the initial step of coagulantion. Therefore, such a measure is sufficiently practical. However, when the length of the cylindrical hole is larger than the opening size of the net mesh, at least one net opening is inserted in a vertical direction between the tubular film and cylindrical hole wall and the hole wall has a smooth inside surface without any concave groove, the tubular film is adhered to the hole wall through the net openings by the suction due to the reduced pressure, and it is difficult to allow the coagulant to flow down, by the intervention by the net yarns even if the reduced pressure is exerted, as in the case where there is no insertion of the cylindrical net but the hole wall surface is smooth and glossy. As a result, the stationarily supplied coagulant is gradually retained at the upper side of the cylindrical hole to a considerable depth, and at least pushes the tubular film inwardly against the inflation pressure in the inside of the tublar film to leave the tubular film off the hole wall, and consequently a large amount of the coagulant flows down suddenly. The retained liquid is evacuated, and again the tubular film is attached to the cylindrical wall by inflation pressure and suction. The downward flow of the liquid is interrupted thereby. Therefore, the diameter of shaped tubular film is intermittently changed, also the coagulation state is changed and the stationary operation is impossible. As a result, a good product cannot be obtained.

Therefore, when the length of the upper hole wall of the reduced pressure chamber is larger than the net opening, it is generally preferable to fix the cylindrical net to the lower end of the cylindrical hole wall to suspend it. To facilitate the downward flow of the coagulant by suction even if the tubular film in the coagulating step is in contact with the clindrical hole, it has been found necessary to provide a large number of serial rows of concave grooves on the inside surface of the hole wall in order that the necessary amount of the coagulant can flow into the reduced pressure chamber. This is the second feature of the present invention. The object of the apparatus, where the cylindrical net is suspended in contact with the top wall hole of the reduced pressure chamber, can be effectively attained only in such a special case where the length of cylindrical hole is shorter than the net opening and the coagulation of the tubular film is already almost completed in the retained coagulant until the tubular film reaches the hole wall.

However, it is one of the features of the present invention, as mentioned above, to confirm that a large number of serial rows of concave grooves are necessary on the inside wall of the cylindrical hole in the present invention, even when the length of the cylindrical hole is short, or when the net opening of the cylindrical net is small, and the net yarns are so small that the coagulant fails to flow in a sufficient amount, or when the length of the cylindrical hole is longer than the net opening. In those cases, it is not a problem to fix the cylindrical net through the cylindrical hole or fix it to the lower end of the cylindrical hole to suspend it.

Generally in the case of quenching coagulation of the molten polymer liquid, it is necessary to allow cold water in an amount 5 - 40 times, particularly preferably 10 - 20 times the amount of extruded polymer to come in contact effectively with the extruded polymer to effect a rapid temperature decrease by about 150°–200°C. Further, in the case of the polymer dope, the coagulation can be advantageously promoted with a coagulant always having a nearly constant concentration, when an amount of the descending contacting coagulant is likewise 10 - 20 times that of the dope.

For example, when the desired thickness of the tubular film is 0.1 mm and the coagulant is allowed to flow down at a speed equal, on average, to that of the film in an amount 10 - 20 times that of the extruded polymer liquid, while being stirred on the surface of the tubular film, the coagulant flows down along the film surface at an attached coagulant thickness of 1 - 2 mm, on average, on the film surface, but actually its thickness will be reduced to almost half by the acceleration by gravity. The free downward flow of the coagulant at such a thickness on the film surface is liable to undergo immediate channelling by the surface tension of the liquid. The use of the outside contacting cylindrical net of the prior invention by the present inventors has an effect upon the prevention of such a channelling, but the tubular film is too weak at the initial stage of coagulation, and therefore a net of finer openings are often applied. In this case, the downward flowing coagulant layer having said thickness freely falls along the outside of the cylindrical net covering the tubular film, while undergoing the channelling flow, and all of the downward flowing coagulant is not in contact effectively with the tubular film in the coagulating step. This is a disadvantage of the prior invention.

If the length of the cylindrical hole of the upper wall is prolonged, the coagulant is well stirred in the serial rows of concave grooves with zigzag courses, and the coagulant passing through the cylindrical hole is effectively utilized, depending upon the distance, but in any case the concave groove generally has a triangular or rectangular cross-section of 2 - 3 mm width and 1 - 3 mm depth, and the width of the projected top is 0.3 - 1 mm in most cases. When the length of the cylindrical hole is made longer, it is necessary to make the degree of reduced pressure higher to allow the required amount of the coagulant to flow down into the reduced pressure chamber by suction. When the coagulating speed of a polymer liquid is slow, the excessive reduced pressure often brings about such a disadvantage that the tubular film is projected through the net opening by suction in the reduced pressure chamber. Therefore, in the most cases, the length of the cylindrical hole of the upper wall is 50 mm at the longest to avoid the excessive reduced pressure, and usually 20 - 30 mm. Particularly when a long distance is necessary for the coagulation, as mentioned above, at least one collar-like weir for gathering the liquid for a while in a ring-shape pool is provided in contact with the outside of a cylindrical net suspended at the lower end of the cylindrical hole of the upper wall, whose lower end is open to the reduced pressure chamber, at a distance as near as possible from one pool to another. When the depth of the pool is properly selected according to the degree of the reduced pressure of the reduced pressure chamber, the liquid column pressure of the liquid gathered in the pool can repress the excess expansion of the tubular film by a pressure effect due to a sum of the internal inflating shaping pressure of the tubular film and the reduced pressure, whereby the tubular film is prevented from projecting through the net openings outwards and also from pushing the tubular film inwards. Further, the descending coagulant can be prevented from forming channelling thereby, and the coagulation of a tubular film in the coagulating step can be promoted by the good contact of the tubular film with the coagulant, while making the liquid temperature or liquid concentration uniform weir by weir through the stirring taking place in the weirs. The outer peripheral skin portion of the tubular film is sufficiently coagulated in this manner and can withstand the contact with the cylindrical net, while the outside of the cylindrical net is directly exposed to the reduced pressure. From this point forwards, the net openings are made coarser. That is, when a net of larger yarns is used, the coagulant can be made to flow down along the net openings without any provision of weirs for gathering the liquid, while changing the direction of the downward flow at every net yarn. The channelling can be prevented thereby, and all the amount of the downard flowing coagulant is effectively utilized in the coagulation.

While the coagulation is insufficient, the channelling of the coagulant, even when it is outside the cylindrical net, brings about some uneven distribution of the tension towards the die. Such is undesirable for shaping a tubular film having a uniform thickness. However, at the state where the coagulation has advanced, the tubular film is far from the die and in a solidified state. Therefore, even if the coagulant undergoes some channelling flow at the outside of the cylindrical net, the uneven distribution of the tension exerted thereby, is made even by the contacting cylindrical net, and no unfavourable influence is given to the die side.

An object of the present invention is to provide an improved apparatus for steadily shaping a tubular film from a molten liquid of a polymer through a coagulation by water cooling.

Another object of the present invention is to provide an improved apparatus for steadily shaping a tubular film from a dope where a polymer is dissolved in a solvent.

Further objects of the present invention will be clear from the disclosure of the present invention.

Now, the present invention will be explained in detail, referring to the accompanying drawings:

FIG. 2 shows that a suspended cylindrical net takes a hyperboloid-like converged shape under a tension when no tubular film passes through the net.

FIG. 3a is a horizontal cross-sectional conceptual view showing such a state that the tubular film in a coagulating step is internally in contact with an upper wall hole of a reduced pressure chamber;

FIG. 3b is a partially enlarged view of a concave groove portion;

Figure 1:
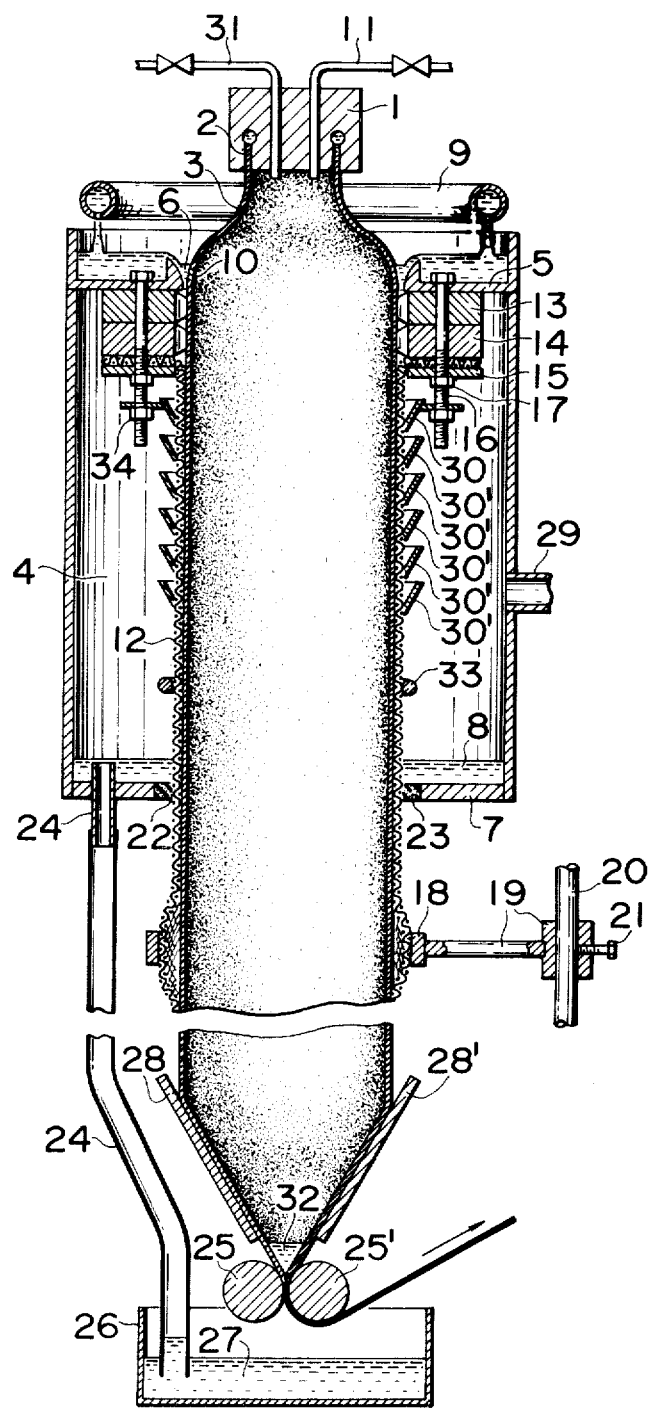
FIG. 1 is a vertical cross-sectional view of one embodiment of the present invention in pratice.

FIGS. 3c and 3d are partially enlarged, cross-sectional views of the upper wall hole, which is a cylindrical hole consisting of a stack of two rings, one being placed upon another, relative to horizontal (i.e. water) level being provided on the inside wall of each ring, a concave groove relative to horizontal (i.e. water) level being formed at a joint part when the two upper and lower rings are assembled, and vertically communicating rows of concave grooves being formed with inclined relative to horizontal (i.e. water) level zigzag courses.

In FIG. 1, a tubular polymer liquid 3 extruded from an annular slit 2 of a die head 1 is passed through a reduced pressure chamber 4 vertically and concentrically with the annular slit 2, and the outer periphery of the film surface at the upper side of the upper wall 5 of the reduced pressure chamber is sealed to keep a reduced pressure by the supplied coagulant flowing down through a gap 6. The outer periphery of the film surface at the upper side of the lower wall 7 is sealed to keep a reduced pressure with a retained liquid 8 of the downward flowing coagulant. The flow of the coagulant supplied from a tube 9 is rectified and the coagulant is retained as a retained liquid at the gap 6 at the outer periphery of a tubular film 10 in a coagulating step in a depth enough to prevent air from being sucked into the reduced pressure chamber. In most cases, the tubular polymer liquid 3 is inflated by the internal inflating pressure of a pressure gas supplied from a pipe 11 before it reaches said liquid level of the retained liquid, and undergoes coagulation after it comes in contact with the surface of the retained liquid in the gap 6. The depth of the retained liquid is made larger and more liquid can be retained when the internal inflating pressure is higher or when the reduced pressure of the reduced pressure chamber 4 gives stronger influences on the bottom part of 6, but usually the depth is in a range of 5 – 15 mm. Anyway, provision of some liquid level for retaining the liquid for the reduced pressure sealing is one of the necessary conditions, because the coagulation starting point can be brought to a horizontal level in parallel with the die exit level and a uniform tension can extend to the die side.

When a coagulation can proceed only within an immersion depth of the retained liquid portion to such an extent that the tubular film can withstand the sliding friction against the cylindrical net, as in case of shaping of a thin tubular film from a molten polymer with cold water, a cylindrical net 12 can be directly fixed to an upper wall plate 5 of the reduced pressure chamber, but when the desired tubular film is a thick product or when the shaping is carried out at such a high speed mass production of a film having a 1 m diameter as at a speed of 100 m/min, even though the film is thin, the upper wall hole must be a cylindrical hole having some length and the cylindrical net must be fixed to the lower end of the upper wall to suspend it. In the drawing, especially as shown in FIG. 3d and explained later, a case is shown, where the cylindrical hole is composed of a combination of rings 13 and 14 at two stages, each ring having concave grooves on the inside wall surfaces.

When the thickness (vertical length) of one ring is, for example, 15 mm, a cylindrical hole having 30 mm length can be obtained. The upper end of the flexible cylindrical net 12 is inserted between the lower end of the cylindrical hole and a thin plate ring washer 15. When the rings at the respective stages are fixed to 5 with through-bolts 16 and nuts 17, the cylindrical net can be suspended at the lower end of the cylindrical hole. A horizontal ring 18 for expanding the cylindrical net having a little larger inner diameter than the outer diameter of the desired tubular film is fixed to the lower part of the cylindrical net, and a suspending tension of the cylindrical net can be adjusted by moving a support frame 19 of the ring up or down along a vertical shaft 20. In the drawing, 18 is fixed below the reduced pressure chamber, but can be fixed within the reduced pressure chamber.

In FIG. 2, the cylindrical net takes a hyperboloid-like, converged shape between the support rings when no tubular film passes through the cylindrical net, the upper end of the net is fixed to the lower end of the cylindrical hole and a tension is applied to the net by adjusting the position of the ring for expanding the cylindrical net at the lower part of the net. The larger the tension applied to the cylindrical net by lowering the position of 18, the stronger the force to keep the net in the hyperboloid-like converged shape. As a result, the net will strongly press and hold tightly the tubular film which is liable to expand by the internal pressure and the outside negative pressure. When an excessive tension is applied to the cylindrical net, the net will so strongly press the tube that the expanded tubular film will be wrinkled. Therefore, the position of 18 is properly adjusted in order not only to exert such an effective pressing force and thus to keep always no wrinkle state of the contacting tubular film, but also to exert an effective tension to produce a friction sufficient to prevent the tubular film from free falling with all the flowing down coagulant attached thereto, and then fixed by a set bolt 21. In deciding the positon of 18, it is a preferable procedure to inflate the already prepared tubular film with a pressure gas having a predetermined internal inflating pressure to make the tubular film contact with the cylindrical net within the reduced pressure chamber, allowing the predetermined amount of coagulant to flow down along the cylindrical net, determine the position of 18 by a preliminary test so that the contacting tubular film may not be throttled in a hyperboloid-like shape and wrinkled, and then start the actual operation. Sometimes it is possible to readjust the position during the operation.

To lessen a leakage of the retained liquid on the lower wall of the reduced pressure chamber through the net openings of the cylindrical net at the hole 22 for the passage of the tubular film, a soft sponge 23 is used as a sealing material. The retained liquid 8 at the upper side of the lower wall of the reduced pressure chamber serves as a reduced pressure sealing and the excessive liquid is passed through an overflow pipe 24, whose other end is open to the bottom part of the retained liquid 27 in a coagulant receptacle 26 under pinch rollers 25 and 25' for withdrawing the tubular film, whereby a reduced pressure sealing can be secured through submerged outlet of the overflow pipe. The tubular film is symmetrically flattened by guide means 28 and 28'.

The pressure of the reduced pressure chamber is controlled through a pipe 29. Unless the pressure of the reduced pressure chamber is increased with the increase of the vertical length of the cylindrical hole at the upper wall of the reduced pressure chamber, the downward flow of a definite amount of the coagulant becomes difficult, and when the reduced pressure is higher, the tubular film in the coagulating step is more liable to be projected out of the net openings outwards, and troubles are often brought about. In such a case, the pressure of the reduced pressure chamber is mainly restricted to the minimum extent necessary for supporting the tubular film on the cylindrical net by friction. When the cylindrical hole is shorter and the coagulation takes place insufficiently, an arm of a weir 30 for retaining the coagulant, which has an inner diameter equal to that of the cylindrical hole, is supported by a nut 34 on a bolt 16 near the lower side of the cylindrical hole at the opening part of the reduced pressure chamber and in contact with the outside of the cylindrical net, and preferably additional weirs 30' for holding the coagulant are suspended at many stages close to each other as shown in the FIG. 1. The tendency to expand the tubular film in the coagulating step out of the net openings of the cylindrical net by a pressure effect due to the sum of the internal inflating pressure and the reduced pressure is reduced by a counter-pressure exerted by the liquid retained in the weirs. At the same time, the coagulant flowing down along the outside of the cylindrical net can be prevented from conducting partial flow by regular cuts-off provided at the lower side-walls of the weir holes and well-mixing of the descending liquid can be attained therein. As a result, the descending coagulant can be effectively utilized for the coagulation of the tubular film, and the tubular film, which is in the state insufficiently coagulated, can be prevented from inflating and at the same time expanding the cylindrical net not contacting therewith beyond the diameter of the cylindrical hole. A weir of any other suitable shape for retaining the coagulant can be used than that illustrated in the drawing, so long as it can attain said object. When the tubular film reaches a certain degree of coagulation, the inflation of the tubular film is discontinued without use of any further weir for retaining the coagulant or a ring 33 for controlling the outer diameter, and no expansion of the tubular film into the net openings takes place even by using a coarser net. The coarse net is made from larger yarns and thus the channelling of the descending liquid can be prevented and the tubular film can be supported at a constant diameter stably by the friction.

Since the cylindrical net undergoes excessive expansion or excessive throttling, depending upon the degree of reduced pressure applied to the reduced pressure chamber and the tension applied to the cylindrical net, or the length of the cylindrical net or number of net openings around the periphery of the net, at least one of said rings 33 for controlling the outer diameter is sometimes provided under the weir for retaining the coagulant to prevent the net from performing excessive expansion or excessive throttling.

At the upper part of the cylindrical net, one side of a net opening is usually 5 – 15 mm long, and a net having net openings closely arranged horizontally is used, and a large number of weirs for retaining the coagulant are provided along the net. After the coagulation has proceeded, the cylindrical net having net openings arranged coarsely in a horizontal direction, that is, the net having large net openings in the horizontal direction, is used.

As shown in the drawing, the weir for retaining the coagulant often used is a collar-like weir having an expanded upper end and a tapered lower end, but a flat bottom weir can be used. Regular concave cuts off for preventing the channelling flow are provided around the hole which contacts the cylindrical net. All the coagulant is usually supplied to the upper side of the upper wall hole, but a portion of the coagulant may be poured into the upper weir 30 provided in the reduced pressure chamber. Further, an anti-blocking agent solution or coagulant is often poured into the tubular film through a pipe penetrating through the die head, and the operation is often carried out so that said solution may be retained to some level above the pinch rollers. To keep the level of the retained liquid 32 nearly constant, a siphon tube penetrates through the die head though not shown in the drawing, and one end of the siphon tube is made open into the retained liquid 32, and other end is made open into the outside liquid level tank. The liquid level of 32 can be kept nearly constant thereby.

Particularly when a tubular film is shaped by a wet process from an organic solvent dope having a 40 – 50 % (by weight) polyacrylonitrile concentration with an aqueous coagulant, or when a tubular film is shaped by a wet process from a hot watery dope having a 40 – 50 % (by weight) polyvinyl alcohol concentration with a concentrated sulfate solution as a coagulant, the poured and retained liquid is made to be renewed with a siphon tube to keep some liquid level in the tubular film, as mentioned above. The coagulation of the tubular film from the inside surface of the film can be accomplished thereby and also the blocking can be prevented.

Another important effect of the retained liquid can be attained in the following case. When the diameter of the shaped film is as large as about 1 m even in the case of water cooling and coagulation of the molten polymer, the internal inflating pressure is reduced to such a low pressure as less than 2 mm even in the shaping of a film of smaller diameter having an equal thickness. In such a case, the tubular film is stably supported by and in contact with the cylindrical net, without any formation of wrinkles within the reduced pressure chamber by suction under the reduced pressure, as in the case of the shaping of a polymer dope by wet process, but at the portion of the tubular film below the reduced pressure chamber, running under atmospheric pressure, the internal pressure of the tube is so low that the tubular film is liable to be easily wrinkled by the channelling flow, etc. of the coagulant flowing down along the surface of the film. Also, the proper effect of the flattening guides 28 and 28' cannot be expected. However, when a liquid is made to be retained within the tubular film in the flattening step above the pinch rollers, film portions towards the pinching surfaces of the rollers is supported by said pinch rollers, but at both end parts the film in the flattening step is stretched towards the direction of both edges by a liquid column pressure having a tendency to expand to said direction. Therefore, the wrinkles are stretched and a folded flat film free from the wrinkles can be effectively withdrawn. That is, the wrinkles of a tubular film which is liable to be formed under a low internal inflating pressure can be effectively stretched thereby. In other words, the retained liquid can play a very important role particularly in the shaping of a tubular film under a low internal pressure as well as the promotion of coagulation of the inside surface of the film by the retained liquid and the effect upon the prevention of blocking by the pressure of the liquid. The depth of the retained liquid, in case of this film shaping, is usually about 5 cm.

In FIG. 3a, a tubular film 44 in the coagulating step is in contact with the projected tops 43 or 43' at the side wall of a large number of concave grooves 42 or 42' at the inside wall of a cylindrical hole 41 at the upper wall of the reduced pressure chamber.

In FIG. 3b, when the concave grooves have triangle cross-sections, the concave grooves take a structure of the shapes 42 and 43. When the concave grooves have rectangle cross-sections, the concave grooves take a structure of shapes 42' and 43'. In FIGS. 3c and 3d, the cylindrical hole at the upper wall consists of a stack of two rings 13 and 14, one ring being placed upon another, and inclined concave grooves relative to horizontal (i.e. water) level 42 are provided at the inside wall of each ring. When the respective rings 13 and 14 are placed one upon another and assembled, a horizontal concave groove relative to horizontal (i.e. water) level 45 is formed at the joint part of the rings, because the upper and lower edges of concave grooves at each stage of ring are rounded or cut off. Further, the inclined concave grooves relative to horizontal (i.e. water) level of the upper ring are communicated with the corresponding ones of the lower ring with zigzag courses. In addition to the inclined concave groove relative to horizontal (i.e. water) level arrangement, a staggered arrangement of vertical concave grooves at many stages can be used.

Even if the length of the cylindrical hole is given, the cylindrical hole can be formed from the desired number of stages of the rings quite freely by changing the height of rings.

The width of the concave groove is usually about 2 – 3 mm and the width of the projected top is often narrower than 1 mm. The coagulant is filled in the concave grooves and therefore there is almost no danger of the tubular film which almost nearly contacts with the projected parts, entering into the concave grooves.

In the present invention, the cylindrical net having equal mesh-opening sizes from the top end to the lower end can be used without any trouble, but when the coagulation takes place slowly, particularly when a coagulated film is prepared from a dope, it is convenient in supporting a coagulated thin layer of an extruded polymer liquid in the coagulating step in a state resistant to pressure without any trouble as well as in coagulating properly a tubular film of the desired diameter to use a net whose mesh-openings are closely arranged in a horizontal direction at some distance from the upper end of the cylindrical net in the reduced pressure chamber so as to make a ratio of opening less. However, in that case, it is necessary to provide weirs for preventing channelling flows around the outside of the cylindrical net, as already mentioned above.

The reduced pressure chamber must be long enough to realize the coagulation of the tubular film to an extent capable of supporting the tubular film stably by a sliding friction developed between the cylindrical net and the tubular film in the reduced pressure chamber. Usually, the reduced pressure chamber is about 30 – 150 cm long. When the side wall of the reduced pressure chamber is of a bellows-type structure of a soft transparent cylindrical film in which a plurality of metal rings are inserted, the reduced pressure chamber can be freely lengthened or contracted and is convenient for the handling of inside devices.

Of course there are often cases where the reduced pressure chamber is made of a metal plate, the handling of the inside is carried out through a hand-hole or a transparent peep window is provided to observe the inside.

Sometimes, an air-cooling ring is provided below the die to cool a tubular polymer liquid after extruded, though not shown in FIG. 1 and actually not always necessary. When such an air-cooling method is used, the internal inflating pressure can be increased and therefore, the air-cooling method is convenient for shaping a tubular film having a particularly large diameter. When no air-cooling ring is provided, a shielding wall must be provided to eliminate any influence by the movement of the atmospheric air between the die and the coagulant surface.

The distance between the die and the coagulant surface will be explained below. In shaping a tubular film by wet process, the higher the internal inflating pressure, the stabler the balloon and easier for steady operation. Even at the same inflating ratio (blow up ratio), the internal pressure can be made higher when the coagulant surface is closer to the die, but it is almost impossible to inflate a film in such an inflating step that the film may proceed along a surface having an angle of more than 45° to the vertical line. Therefore, the higher the inflating ratio, or the larger the diameter of the tubular film, the larger the distance between the die and the coagulant surface. When the distance therebetween is larger, a shield wall is provided to eliminate an influence by the surrounding atmospheric air, or rather in the case of a tubular film of a larger diameter, the air cooled to a constant temperature is positively injected therebetween through the air-cooling ring device to make the surrounding conditions constant. When the shield wall is provided, the air within the shield wall is evenly sucked from one of the upper or lower side of the shield wall. When air-cooled, the internal inflating pressure can be increased though a little, and the operation can be thus carried out readily.

EXAMPLE 1

A low density polyethylene molten liquid was extruded downwards from a die slit having a diameter of 15 cm at a rate of 1.6 kg. per minute by means of an extruder having a screw diameter of 90 mm and inflated to a diameter of a little more than 30 cm with an internal gas having a pressure of 8 mm water column till it reached the coagulant level below the die slit. Further, it was cooled with water at 20°C supplied at a rate of 30 l/min thereto. The cylindrical hole at the bottom of the coagulant reservoir was a stack of two rings, each having an inner diameter of 30 cm and a thickness of 13 mm. Triangular concave grooves having a width of 2 mm and a depth of 2 mm were provided on each ring at an inclination of 45° relative to horizontal (i.e. water) level, and the width of the projected tops was 0.3 − 0.5 mm. The edges of the upper and lower ends of the projected parts were cut off and a horizontal triangular concave groove having a width of 4 mm was formed when the rings were assembled. The inclined concave grooves relative to horizontal (i.e. water) level on the upper and lower rings were communicated with one another with zigzag courses on the inside wall of the cylindrical hole. The pressure of the reduced pressure chamber was kept at −15 mm water column, and a cylindrical net having 200 net openings around the entire periphery and a width of one side of the net opening of 10 mm was suspended under a tension at the lower end of the cylindrical hole, and two inclined collar type weirs for retaining water, each having a height of 15 mm, were provided stagewise at the upper part of the net. The shaping speed of the tubular film was 8.5 m/min, and a soft tubular film for heavy duty sack having a thickness of 0.22 mm and thickness allowance of ±5 percent was obtained by the quenching effect.

In Example 1, the extruder was of small type, the extrusion rate was small, the diameter was small and the shaping speed was low. However, if a larger extruder having a capacity of more than 10 t/day is used, a tubular film having such a larger diameter as about 1 m but such a small thickness of about 0.02 mm can be obtained at a high speed of about 100 m/min. When the thickness is larger, the shaping can be effected at a lower speed. In such a mass-production extruder, the weirs for retaining the liquid must be used at many stages.

When the extrusion rate is constant, the internal inflating pressure becomes smaller according to increase in diameter of tubular film, and therefore the stable shaping is possible only by using the apparatus provided with the reduced pressure chamber of the present invention.

When the internal inflating pressure, that is, the internal balloon pressure is small, the tubular film is liable to undergo vertical wrinkling below the reduced pressure chamber until it is folded to a double flat sheet by the pinch rollers through the flattening guides, but when water having a depth of about 50 mm is provided within the tubular film above the pinch rollers by supplying water thereto through the die head, the retained water can exert a pressure outwards from the inside of the tubular film.

When the tubular film is flattened, both edge parts of the film is stretched outwardly thereby, and thus a widening effect can be attained, whereby the tubular film can be folded without no wrinkles. This is a convenient means.

The water-cooling shaping apparatus for the molten polymer of Example 1 can be generally applied to the shaping of a tubular film of thermoplastic resins of such homopolymers as polyethylene, polypropylene, polystyrene, plasticized polyvinyl chloride, polyvinylidene chloride, nylon, polyester, etc. or copolymers belonging to these classes or the resins prepared therefrom by mixing a plasticizer thereto.

EXAMPLE 2

A dope at 100°C prepared by dissolving fiber grade polyvinyl alcohol in hot water at a 45 percent (by weight) concentration under a pressure and successive defoaming was poured into two symetrically positioned spiral grooves in a die head in an equal amount by two gear pumps and made to flow out evenly over the periphery of the slit of the die according to the conventional method. The dope was extruded downward from the die having a diameter of 250 mm at a rate of 2.7 kg/min., and the extruded tubular dope was cooled by air from an air-cooling ring fixed to the outer periphery of the die until it reached the supply liquid level of a coagulant of a 40 percent (by weight) ammonium sulfate solution on the upper wall of the successive reduced pressure chamber, while inflating the dope to a diameter of 300 mm by an internal pressure of 1.0 mm water column. The cylindrical hole at the upper wall of the reduced pressure chamber consisted of two rings, each having an inner diameter of 300 mm and a thickness of 15 mm as shown in FIG. 1, and the communicating concave grooves with the zigzag courses had a rectangular cross-section having a width of about 2 mm and a depth of about 2 mm. The cylindrical hole had 300 grooves at the inside wall with an inclnation of 45° relative to horizontal (i.e. water) level. The pressure of the reduced pressure chamber was −10 mm water column, and the ammonium sulfate solution was supplied onto the cylindrical hole so that it might be kept thereon in the depth of 5 mm.

The cylindrical net made of polyester group yarns and suspended at the lower end of the cylindrical hole had a yarn length of 10 mm for one side of the net opening and the openings were in a rhombic form. In the reduced pressure chamber, a net having 260 openings around the entire periphery of the net was used, and below the reduced pressure chamber a net having 220 openings around the entire periphery of the net was jointed thereto. Weirs for retaining the descending coagulant for a while were provided at 30 stages at a pitch of 12 mm from the lower end of the cylindrical hole, and the height of coagulant retained in the weir was 10 mm. The weir having 300 concave cuts-off of a width of 2 mm at the lower end thereof was used. Further, controlling rings were provided at stages at a distance of 50 mm below the weir to prevent the channelling flow of the coagulant flowing down along the cylindrical net, and the spontaneous stirring of the coagulant was made to take place at each stage. The entire length of the reduced pressure chamber was 1.2 m. When the tubular film was passed through the last controlling ring after it was passed through the lowest weir, the coagulation of the tubular film was advanced and the tubular film was moved down in contact with the cylindrical net while taking a diameter of about 300 mm. The tension of the cylindrical net was adjusted by raising or lowering the position of the ring for expanding the cylindrical net at the lower part of the reduced pressure chamber so that the coagulated tubular film might not be wrinkled.

Pinch rollers having a diameter of 200 mm and a surface speed of 20 m/min, were provided 3 m below the die, and solution was continuously poured into the inside of the tubular film through the die, and the excess solution was led to the outside through a siphon tube communicating to an outside coagulant tank through the die head so that the solution could be always retained to a depth of 50 mm in the inside of the film. The withdrawn flattened film was cut open to two sheets at both edges, and successively passed within a tank filled with a saturated ammonium sulfate solution at 100°C by 10 m over guide-rollers one after another so that the ammonium solution might be supplied into between two sheets placed one upon another. The attached solution was squeezed from the sheets and then the sheets were passed through a water washing tank at room temperature, and then the attached water was squeezed from the sheets. Then, the sheets were dried initially in a hot air drying chamber and finally over a heated drum, whereby two sheets of films having a width of 450 mm and a thickness of 0.05 mm were obtained.

A wet-process shaping method for a polymer dope using a solvent of Example 2 can be applied to the shaping of a tubular film by a wet process from an aqueous 40 − 60 percent (by weight) polyvinyl alcohol solution, a 40 − 55 percent acrylonitrile solution with such a solvent as dimethylformamide or dimethylsulfoxide, etc., a 40 − 60 percent vinyl chloride-acrylonitrile copolymer solution with such a solvent as dimethylformamide, or other various polymer solution with various solvent.

As explained in detail above, the present invention is to provide an apparatus for shaping a tubular film by a wet process, wherein a tubular polymer liquid including a polymer melt and a concentrated polymer solution extruded from an annular die downwards is allowed to come in contact with a coagulant at the outer periphery of the polymer liquid to shape a tubular film by a wet process, which comprises:

1. vertically passing a tubular film in a coagulating step through a reduced pressure chamber provided concentrically with and under an annular die, 2. sealing, under a reduced pressure, the penetrating holes at the upper and the lower walls of the reduced pressure chamber, through which the tubular film is passed, with coagulants retained on the respective walls, and adjusting the diameter of the tubular film thereby at the same time, 3. moving the tubular film in the coagulating step downwards while keeping its outer surface in contact with a flexible cylindrical net, 4. the flexible cylindrical net being under a controlled tension, its upper end being fixed to the lower end of the upper wall of the reduced pressure chamber or to a position near the upper end of the hole of the upper wall, the lower end of the cylindrical net being fixed to a horizontal ring having a larger inner diameter than that of the tubular film, and the cylindrical net penetrating through the reduced pressure chamber, 5. the cylindrical net being under a controlled tension sufficient to support the weight of the tubular film by a sliding friction between the cylindrical net and the tubular film and a force exerted on the film surface by a descending and adhering coagulant but the tension being not so large to give wrinkles to the tubular film, without any excessive inflation by the tubular film caused by the pressure of the reduced pressure chamber and the internal pressure of the tubular film, 6. providing at least one stage of weirs in contact with the cylindrical net below the hole of the upper wall of the reduced pressure chamber, for retaining a liquid for a while to a depth according to the degree of the pressure of the reduced pressure chamber, 7. providing a large number of concave grooves or net openings corresponding to the concave grooves, capable of communicating and letting the coagulant flow downwards at the inside wall surfaces of the hole of the upper wall of the reduced pressure chamber and weirs for retaining the liquid.

8. making the length of the hole of the upper wall longer according to the degree of the pressure of the reduced pressure chamber to give a resistance to the downward flow of the coagulant and prevent the excessive downward flow, whereby a retained liquid necessary for the sealing for the reduced pressure is always made present at the outer periphery of the tubular film on the hole of the upper wall, 9. providing a control ring below the weir for retaining the liquid to prevent excessive expansion of the cylindrical net when the coagulating speed is slow or prevent excessive throttling when the cylindrical net is particularly long, 10. the required amount of the coagulant being 5 to 40 times, particularly preferably 10 − 20 times, the volume of the extruded polymer liquid per unit time, and 11. the coagulant being supplied into the inside of the tubular film right above the withdrawing pinch rollers, if necessary, particularly when a thin film is shaped, to a liquid depth of about 5 cm to endow an effect upon the prevention of blocking and wrinkling.

In the present invention, a wet-process shaping method having a very great industrial effect capable of shaping a tubular film by a wet process not only from a molten polymer liquid, but also a concentrated polymer solution whose coagulating speed is generally slow, at a high speed shaping, and furthermore particularly shaping a thin tubular film of larger diameter using an extremely low internal inflating pressure, can be attained by properly selecting the specification of the cylindrical net, the tension applied to the cylindrical net, the degree of pressure of the reduced pressure chamber, the specification of weir for retaining the liquid, etc. in view of the properties of the polymer liquor used.

We claim:
1. An apparatus for supporting, calibrating and coagulating a tubular film during a downward film blowing process comprising
 a. an extruding means for thermoplastic polymer including an annular die that has an extruding slit,
 b. a feeding pipe for pressurized air that is to inflate the extrudate into a tubular film,
 c. a coagulant distributing means located concentrically below said extruding slit and including a coagulant distributing vessel and piping for suppling coagulant,
 d. a taking up means for said tubular film,
 e. a flexible cylindrical net which concentrically surrounds said tubular film for a substantial part of its inflated length,
 f. a cylindrical passageway beneath said annular die which has a size and shape to accommodate the downward passage of the tubular film in its inflated condition,
 g. the upper end of said flexible cylindrical net being suspended from said passageway beneath said coagulant distributing means,
 h. the lower end of said net facing said taking up means and being fixed to a ring member provided with a stretching means for said net which is capable of adjusting the diameter of said net to the approximate diameter of said inflated tubular form,
 i. a reduced pressure chamber with exhaust piping means, said chamber extending beneath said coagulant distributing means and surrounding both said inflated tubular film and said flexible cylindrical net,
 j. the upper portion of said cylindrical passageway that is adjacent to the point where the coagulant liquid first contacts the top of said net being composed of at least two ring members that concentrically surround said inflated tubular film and are vertically stacked upon one another in a coaxial manner,
 k. the inside walls of said ring members being provided with a plurality of grooves that are each inclined with respect to a plane through the circumference of the ring member,
 l. the inside walls of said ring members also each being provided with a groove around the internal circumference and which is positioned adjacent one internal edge portion, whereby stacked ring members present a downward flow path that permits the coagulant to flow down uniformly between the inner walls of the ring members and the other wall of the tubular film,
 m. a sealing device furnished on the periphery of the lower opening of the reduced pressure chamber through which the tubular film enveloped in the net passes, and
 n. a passgeway for discharging surplus coagulant that collects in the bottom of the reduced pressure chamber.

2. An apparatus according to claim 1 wherein around said flexible cylindrical net in the upper part of the reduced pressure chamber there is mounted at least one collar-like weir that concentrically contacts the net through which the tubular film passes and capable of temporarily retaining the down-flowing coagulant in a ring shaped pool around the tubular film in a sufficient depth that the excess expansion of the tubular film is cancelled.

* * * * *